Oct. 23, 1962      G. E. STAPLES      3,059,678
PECAN CRACKER

Filed April 25, 1960      2 Sheets-Sheet 1

INVENTOR
G. E. Staples

BY Wilkinson, Mawhinney & Theibautt
ATTORNEYS

Oct. 23, 1962  G. E. STAPLES  3,059,678
PECAN CRACKER
Filed April 25, 1960  2 Sheets-Sheet 2
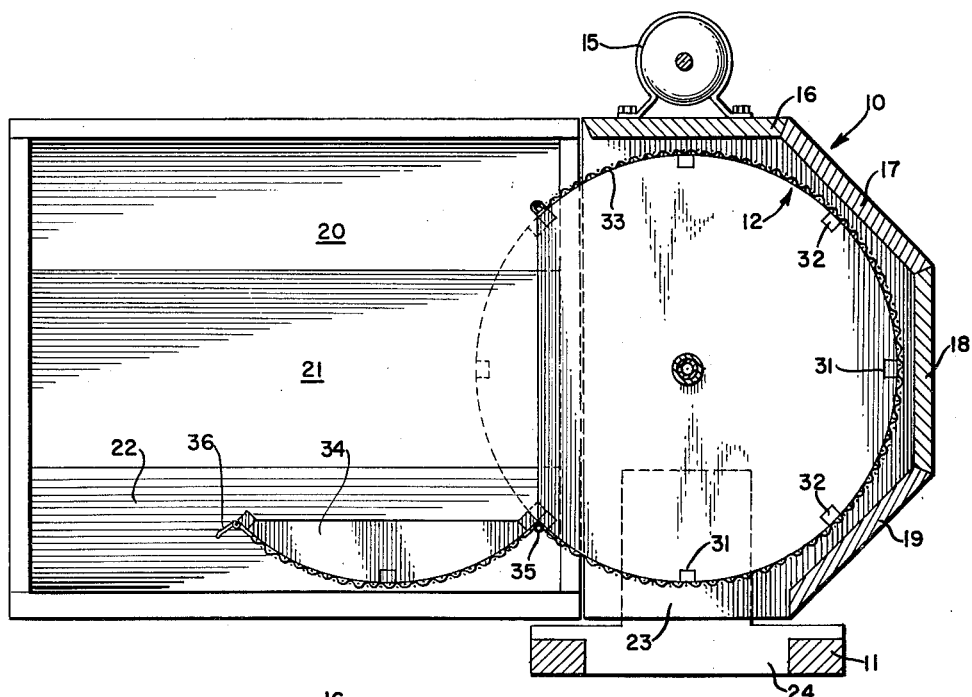
FIG. 3.
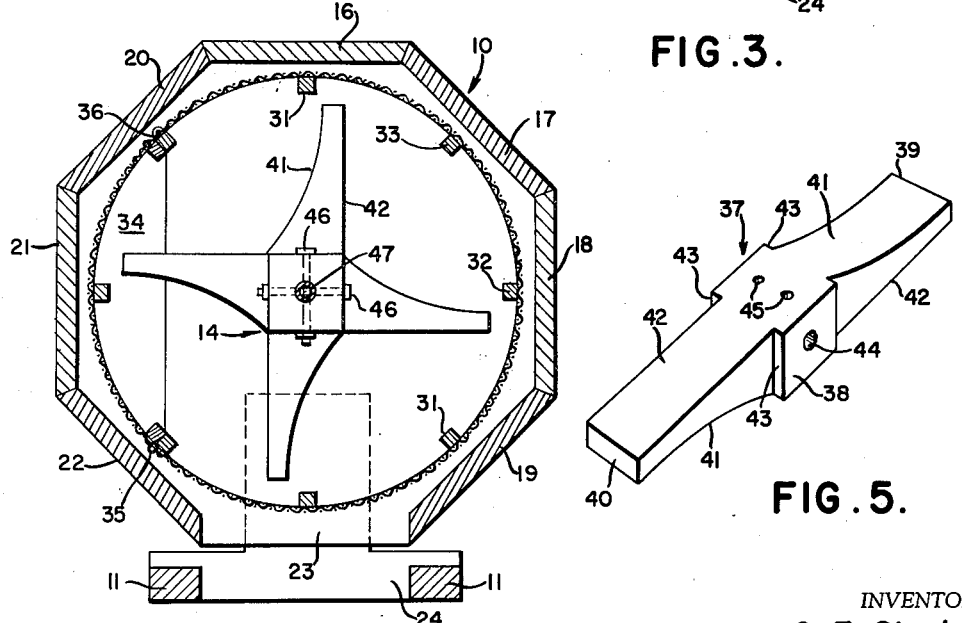
FIG. 4.
FIG. 5.
INVENTOR
G. E. Staples
BY
Wilkinson, Mawhinney & Theibautt
ATTORNEYS

United States Patent Office 3,059,678
Patented Oct. 23, 1962

3,059,678
PECAN CRACKER
Gerald E. Staples, 905 Mississippi Ave., Greenwood, Miss.
Filed Apr. 25, 1960, Ser. No. 24,551
3 Claims. (Cl. 146—11)

The present invention relates to pecan cracker and has for an object to provide a machine for shelling pecans by projecting the same with force against abutments or anvils which will result in the bursting of the hulls and the release of the nut meats in substantially whole condition commanding a high market price.

Another object of the invention is to provide a pecan or other nut cracker in which a novel form of propulsion rotor includes paddles for centrifugally propelling or projecting the nuts against such anvils or anvil bars of an encompassing drum which will crack the hulls and cause evacuation of the broken hulls and meats in an expeditious manner from the machine.

A further object of the invention resides in providing a nut cracker of a simple and inexpensive form in which provision is made for high capacity recovery of the nut meats and in which the cracking drum may be rotated in one direction while the paddles are rotated in an opposite direction.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 3 is a transverse sectional view taken on the line 3—3 in FIGURE 2 showing the machine in open position ready to receive a charge of the nuts;

FIGURE 4 is also a vertical sectional view taken on the line 4—4 in FIGURE 2 with the drum and housing closed in a condition of operation, and FIGURE 5 is an isometric view of one of the paddle units.

Figure 1:
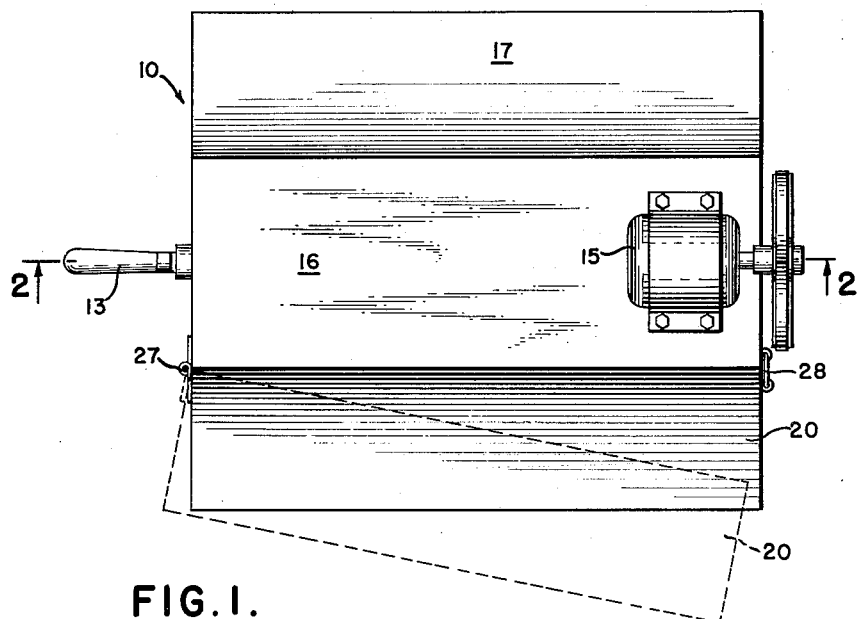
FIGURE 1 is a top plan view of a pecan cracker constructed in accordance with the present invention.

Referring more particularly to the drawings, 10 designates an external housing mounted on a suitable base 11 and having journalled therein a rotary drum 12 which may be manually rotated by a hand crank 13 or other appropriate device.

Within the drum is mounted a propulsion rotor 14 adapted to be automatically and continuously rotated by an electric drive motor 15 or other suitable source of power.

In the single form of the invention illustrated in the drawings, which has proved in use a satisfactory device, the housing is of a generally octagonal form having a top panel 16, closed side panels 17, 18 and 19, side door panels 20, 21 and 22 and a bottom opening 23 which registers with a similar opening 24 in the base 11.

The housing is closed at its ends by end heads 25 and 26, to one of which is affixed the hinges 27 for the door composed of the connected panels 20, 21 and 22. A suitable latch 28, shown in FIGURE 1, may be employed for holding the door in a closed position.

The drum 12 is formed of end heads 29 and 30 having peripheral notches 31 to receive the end portions of anvil bars 32, the drum being covered by hardware cloth or screen mesh material 33 which constitutes the peripheral wall of the drum. The seating of the end portions of the anvil bar 32 in the notches 31 enables the outer portions of these bars to be flush with the perimeter edges of the drum heads 29 and 30 so that the cloth or screen 33 may be made to assume a substantially cylindrical form aranged in spaced relation to the interior wall of the housing, as shown in FIGURE 3.

The drum is provided with a lateral door 34 in registry with the door of the housing but, whereas the housing door is mounted about a substantially vertical hinge axis at one end, the drum door 34 is preferably connected with the drum by a hinge 35 on a horizontal pintle axis at the lower end of the door 34 to permit the latter to open downwardly and outwardly. A latch 36 at the upper free end of the door may cooperate with an appropriate keeper on the drum to hold the drum door 34 in the closed position of FIGURE 4.

Within the drum is mounted the propulsion rotor 14 consisting of an appropriate number of rotor paddles 37 of a form substantially as shown in FIGURE 5 in which each paddle comprises a central hub 38 with radiating blades 39 and 40 preferably radiating from the hub in relatively opposite directions, that is, displaced from one another by approximately 180 degrees.

The leading faces 41 of the blades are curved from the hubs outwardly and rearwardly with respect to the direction of rotation so that at their juncture with the hubs 38 they provide a relatively thick strong cross section and they progress outwardly into narrower sections which facilitate the movements of the nuts along the curved faces 41 and this cutaway section of the paddle blades increases the capacity of the machine by expanding the space between angularly spaced blades.

The trailing faces 42 of the blades are preferably straight to add strength to the outwardly diminishing cross sections.

Figure 2:
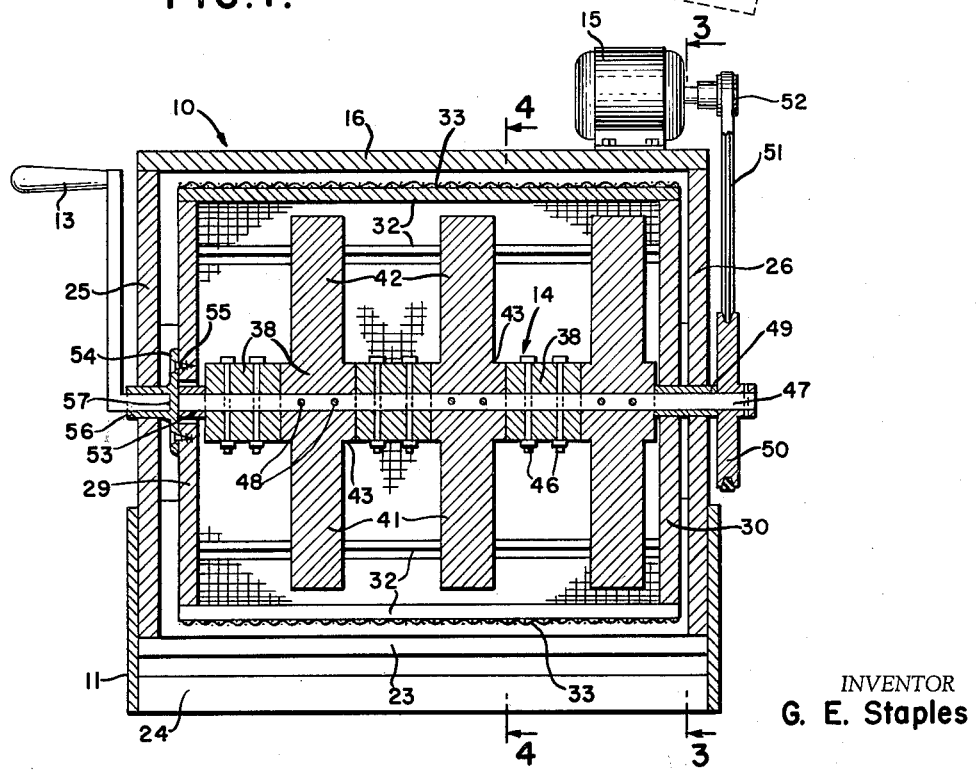
FIGURE 2 is a longitudinal vertical section taken on the line 2—2 in FIGURE 1.

As best seen in FIGURE 5 and also in FIGURE 2, the blades 41, 42 are preferably narrower axis-wise than their hubs 38 with the result that shoulders 43 are provided upon the outwardly projecting portions of the hubs.

Bores 44 are made through the various hubs 38 of the rotor paddles 37 and holes 45 are also made in the hubs 38 normal to the axis of the bores 44 through which may be entered bolts 46 which also pass through holes 48 in a rotor shaft 47.

This rotor shaft 47 is journalled for rotation at one end within a bearing sleeve 49 externally fitted in one of the end heads 26 of the housing in which the sleeve 49 may rotate or be fixed. This bearing sleeve 49 also forms the bearing for the end head 30 of the drum. The bearing sleeve 49 is maintained against axial displacement by abutting at its inner end against the outermost hub 38 and at its outer end against a pulley 50 fixedly mounted on the outer projecting end of the rotor shaft 47, which pulley receives a belt 51 also trained about a pulley 52 on the armature shaft of the electric motor 15 which is installed upon the top panel 16 of the housing, as illustrated in FIGURE 2.

The other end of the rotor shaft 47 is fitted rotatably in a bearing socket 53, which bearing socket is affixed to a flange 54 held by screws 55 or other appropriate fastenings to the other end drum head 29. Projecting outwardly from the flange 54 is a bushing 56 journalled for rotation in the housing end head 25. This bushing 56 may be of square or other straight-line form to conform to a similar cross sectional form of the shank 57 of the crank handle 13 in order that rotation of the handle may impart similar rotation to the drum.

The mesh wall 33 of the drum and the bars 32 may be affixed in place to the drum heads by nails or other fastenings.

It will be noted from FIGURE 2 that successive paddles 37 may be angularly displaced from one another preferably by an angle of substantially 180 degrees which will tend to prevent falling of the body of nuts to the bottom of the drum.

In operation the doors 20, 21, 22 and 34 are opened initially in the manner shown in FIGURE 3 to permit of the introduction into the interior of the drum of a charge of the nuts, after which the doors are closed and latched and the electric or other motor 15 set in operation to drive the shaft 47 and the paddles affixed thereto at a desired revolution rate in which the concave faces of the paddle blades lead. As the nuts encounter such concave faces 41 they come under the influence of the centrifugal force generated by the rotation of these paddle blades and are consequently thrown outwardly in generally radial directions and caused to impinge against the bars 31 which are preferably square offering sharp cornered portions to the hurled nuts whereby the shells are burst and the meat released.

The meat and hulls will pass through the meshes of the screen 33 and be guided by the panels of the housing down to the bottom exit openings 23 and 24, after which the hulls and meats undergo a separating operation.

During the rotation of the paddles, the drum may also be rotated manually by the hand crank 13 in the same or in an opposed direction causing the lifting of the nuts to the upper portion of the drum and to prevent an accumulation of the nuts by gravity toward the bottom of the drum.

It will be noted, particularly from FIGURE 4, that due to the curvature or inclination of the concave leading faces 41 of the paddle blades, the nuts will acquire a greater centrifugal speed than if the leading faces of the blades were straight and the path 41 is somewhat greater than the straight path thus imparting added impetus to the nuts in their centrifugal travel outward and consequently increasing efficiency with respect to cracking.

A satisfactory machine has been made economically of wood in which the housing is of plywood of approximately three-quarters of an inch thick. The base 11 may consist generally of two-by-fours.

The rotor or paddle construction has been made of oak wood, eleven inches long by two-and-three-quarters inches at the center. The blades taper from one-and-one-half inch at center to one-half inch at the outer ends. The sides of the blades 39, 40 are cut in approximately three-quarters of an inch with respect to the hub 38 which increases the room for the movement of the nuts.

The bore 44 is made approximately three-quarters inch in diameter to slip over the shaft 47 which is a tubular pipe approximately one-half inch in diameter. The holes 45 and 48 for the bolts may be one-quarter inch in diameter.

The drum has been made in a diameter of fifteen inches and sixteen inches long. The bars 32 are sixteen inches long by one inch in thickness. The ends 29 and 30 of the drum have also been made of plywood one inch in thickness by sixteen inches in length.

For large pecans three-quarters of an inch mesh hardware cloth has been used and for small pecans five-eighths of an inch mesh.

The recovered meats and the broken hulls fall through the bottom of the housing which is the only place in the housing that is left open.

The drum handle 13 is rotated to throw the pecans into the paddles as the pecans are burst, while the paddles are knocking them against the bars 32.

With this machine approximately seventy-five percent of the nuts are recovered in halves (half pecans) and the hulls are picked perfectly clean and the pecans have no part of hull in them or on them.

In view of the simplicity of the construction repairs can be made by any carpenter. The only parts subject to wear are the bearing sleeves and bushings. These will last several years and may be replaced at nominal cost.

Although I have disclosed herein the best form of the invention known to me at this time, I reserve the right to all such modifications and changes as may come within the scope of the following claims.

What I claim is:

1. A pecan cracker comprising a housing having charging and discharge openings, a drum having a cylindrical screen wall of a diameter less than the cross sectional dimension of the housing, means for journalling the drum in the housing with the screen wall spaced all around from the housing to provide an enclosed escape chamber for the commingled broken shells and meats, anvil bars on the drum inwardly of the screen wall, a propulsion rotor comprising a rotor shaft, hubs affixed to the rotor shaft, and a pair of paddles on each hub, each paddle radiating from the hub in substantially diametrically opposite directions, each paddle having a leading and a trailing face, the leading face continuously curved from the hub to the outer end of the paddle outwardly and rearwardly with respect to the direction of rotation, the radially curved leading face being straight lined in the axial sense to avoid imparting axial movement to the nuts whereby the nuts will be thrown out only radially along the radially curved face against the anvil bars, the diametric pairs of paddles being set on the rotor shaft at substantially ninety degrees successively axially of one another, means for journalling the propulsion rotor within the drum with the outer ends of the paddles describing a circle spaced inwardly of the circle of the anvil bars, rotation means connected to the rotor to drive the same, and manual means adapted to be connected to the drum to rotate the same in relatively opposite directions independently of the rotary movement of the propulsion rotor.

2. A pecan cracker as claimed in claim 1 in which the paddles are narrower axis-wise than their hubs.

3. A pecan cracker as claimed in claim 1 further comprising a bearing sleeve mounted in an end of the housing for receiving therethrough an end of the rotor shaft and thereover an end of the drum, and a bearing member fixed to the other end of the drum for receiving the other end of the rotor shaft and having a part journalled in the other end of the housing with means to receive the rotation means.

References Cited in the file of this patent

UNITED STATES PATENTS

| | | |
|---|---|---|
| 450,051 | Babbitt | Apr. 7, 1891 |
| 611,765 | Beach | Oct. 4, 1898 |
| 1,772,971 | Vaudrevil | Aug. 14, 1930 |